(12) United States Patent
Muehlen

(10) Patent No.: US 9,555,969 B2
(45) Date of Patent: Jan. 31, 2017

(54) ENDLESS FABRIC BELT

(75) Inventor: Petra Muehlen, Blaustein (DE)

(73) Assignee: Muehlen Sohn GmbH & Co. KG, Blaustein (DE)

( * ) Notice: Subject to any disclaimer, the term of this patent is extended or adjusted under 35 U.S.C. 154(b) by 0 days.

(21) Appl. No.: 14/238,076

(22) PCT Filed: Aug. 1, 2012

(86) PCT No.: PCT/EP2012/003270
§ 371 (c)(1),
(2), (4) Date: Mar. 12, 2014

(87) PCT Pub. No.: WO2013/020667
PCT Pub. Date: Feb. 14, 2013

(65) Prior Publication Data
US 2014/0183010 A1    Jul. 3, 2014

(30) Foreign Application Priority Data
Aug. 11, 2011  (DE) .......................... 10 2011 110 019

(51) Int. Cl.
*B65G 17/00*        (2006.01)
*B65G 15/30*        (2006.01)
(Continued)

(52) U.S. Cl.
CPC ............ *B65G 15/30* (2013.01); *B31F 1/2877* (2013.01); *D21F 1/0054* (2013.01)

(58) Field of Classification Search
USPC ...................................................... 198/844.2
See application file for complete search history.

(56) References Cited

U.S. PATENT DOCUMENTS 1,932,203 A    10/1933  Diamond
1,948,411 A *   2/1934  Asten .................... A44B 19/42
                                                        24/31 B
(Continued)

FOREIGN PATENT DOCUMENTS

DE        26 23 437 A1    12/1977
DE       195 40 229 C1    12/1996
(Continued)

OTHER PUBLICATIONS

International Search Report of PCT/EP2012/003270, mailed Oct. 18, 2012.

*Primary Examiner* — William R Harp
(74) *Attorney, Agent, or Firm* — Collard & Roe, P.C.

(57) ABSTRACT

A fabric belt for producing a corrugated cardboard web in a corrugated cardboard machine is joined together at the two ends thereof to produce an endless belt. An outer paper side facing the corrugated cardboard web and an inner load side assigned to the drive are formed. Connecting pieces to connect the belt ends have in each case at one end transversely with respect to the belt clips lying next to one another at a spacing, and are fixed at an opposite end with a connection section at the associated belt end. In the longitudinal direction of the belt, the clips of one connecting piece interact in a force-transmitting manner with the clips of the other connecting piece. The connection section of a connecting piece is held in a receiving gap of the belt that, starting from the belt end, extends between the paper side and the load side.

10 Claims, 4 Drawing Sheets

(51) Int. Cl.
*D21F 1/00* (2006.01)
*B31F 1/28* (2006.01)

(56) References Cited

U.S. PATENT DOCUMENTS 3,546,054 A 12/1970 Ross
5,746,257 A 5/1998 Fry
8,172,986 B2 5/2012 Bella

FOREIGN PATENT DOCUMENTS

| DE | EP 1719932 A1 * 11/2006 | ............... F16G 3/02 |
|----|--------------------------|---------------------------|
| EP | 2 055 831 A1 5/2009 | |
| GB | 2289648 A * 11/1995 | ............... B32B 5/26 |

* cited by examiner

ENDLESS FABRIC BELT

CROSS REFERENCE TO RELATED APPLICATIONS

This application is the National Stage of PCT/EP2012/003270 filed on Aug. 1, 2012, which claims priority under 35 U.S.C. §119 of German Application No. 10 2011 110 019.2 filed on Aug. 11, 2011, the disclosure of which is incorporated by reference. The international application under PCT article 21(2) was not published in English.

BACKGROUND OF THE INVENTION

1. Field of the Invention

The invention relates to a fabric belt for producing a corrugated cardboard web in a corrugated cardboard machine.

2. Description of the Related Art

Such a fabric belt is known from U.S. Pat. No. 1,932,203. The fabric belt comprises an outer paper side facing the corrugated cardboard web and an inner load side on which the drive forces are introduced into the belt. Connecting pieces are provided for connecting the belt ends into an endless belt, which connecting pieces consist of a fastening strip with connecting clips and a connecting section, which surrounds the fastening strip as an outer fabric web. The fabric web of the connecting section is placed on the belt ends and is tightly sewed thereon in such a way that the fastening strips represent an extension of the belt end. The coupling clips of the opposite ends which are fixed in the fastening strip engage in a meshing fashion into each other and are connected to each other in a force-transmitting manner by a coupling rod.

The fabric strips of the connecting section which are sewed onto the outer sides of the fabric belt lead to an increase in the thickness in the end region of the belt. This is undesirable both on the load side associated with the drive and also on the paper side carrying the product.

A fabric belt is known from EP 2 055 831 A1 whose belt ends are reduced in thickness in order to form connecting pieces. In these thickness-reduced ends, the fastening clips are fixed and connected in the known manner via a coupling rod in the longitudinal direction of the belt in a force-transmitting manner to each other.

In order to produce the belt connection, the belt ends need to be reshaped, the clips need to be introduced into the reshaped ends and finally need to be flock-coated for height compensation. This type of connection is technically complex and requires long production periods.

SUMMARY OF THE INVENTION

The invention is based on the object of joining the belt ends of a fabric belt in a simple way into a connection that withstands high loads and is easy to open.

The invention is achieved by the features disclosed herein.

The connecting section of the connecting piece can be connected in a simple way to a fabric belt by forming a receiving gap between the paper side and the load side of the fabric belt. This connection lies in the interior of the belt and is hardly subjected to any wear and tear both on the paper side and also on the load side.

The force-transmitting connection between the mutually opposite clips of the belt ends can further be released in a simple way, so that simple dismounting from a corrugated cardboard machine is possible by opening of the endless belt.

The receiving gap extends approximately parallel to the plane of the fabric belt and lies preferably approximately centrally between the paper side and the load side. This symmetrical arrangement ensures an introduction of forces in the middle of the belt, i.e. in the middle plane of the fabric belt.

It may be appropriate to arrange the receiving gap at a larger distance from the paper side than from the load side. If high wear and tear is expected on the paper side, it is advisable to displace the receiving gap in the direction towards the load side, so that sufficient wearing thickness is available on the paper side without impairing the fastening of the connecting sections in the receiving gap of the belt. The depth of the receiving gap measured in the longitudinal direction of the belt approximately corresponds to a portion of the width up to the width of the belt.

The base body of a connecting piece appropriately consists of a fabric strip or a similar structure, which comprises a fastening strip for the clips arranged adjacent to a longitudinal edge. The remainder of the fabric strip can form a connecting section of the connecting piece. The fabric strip preferably consists of the same or a similar material as the belt fabric in order to enable to perform in the receiving gap a material connection by welding of the connecting section with the belt fabric for example. For this purpose, some threads of the belt fabric appropriately consist of a plastic material, especially polyamide, polyester or the Like.

The height of the clips is arranged to be advantageously lower than the thickness of the belt, so that a cavity exists between the clips and the respective belt sides which can be filled by flock-coating and the like for height compensation. This ensures that the clips themselves are situated at a distance both in relation to the paper side and also to the load side.

It may also be appropriate to lay the clips in the receiving gap over a portion of their length measured in the longitudinal direction of the belt. The clips are covered thereby by the fabric of the belt. In an advantageous embodiment, the clips of the connecting pieces are situated completely within the receiving gap at least on the paper side of the belt or are covered by a fabric wall of the receiving gap. It can thus be ensured on the paper side for example that the paper side of the fabric belt is formed without any interruption over the entire length of the endless belt.

The clips consist of plastic in a further development of the invention. Mechanical damage is prevented if they come into contact with the driving components in the case of respective wear and tear on the load side. The clips can advantageously be formed by an integral spiral.

In a further development of the invention, the clips are arranged as members of a zip fastener and are pushed into each other in a force-transmitting way by a slider. The mutually engaging members of the zip fastener form the force-transmitting connection between the two belt ends.

BRIEF DESCRIPTION OF THE DRAWINGS

Further features of the invention are the drawings, in which the embodiments of the invention described below in closer detail are shown, wherein.

DETAILED DESCRIPTION OF THE PREFERRED EMBODIMENTS

Figure 1:
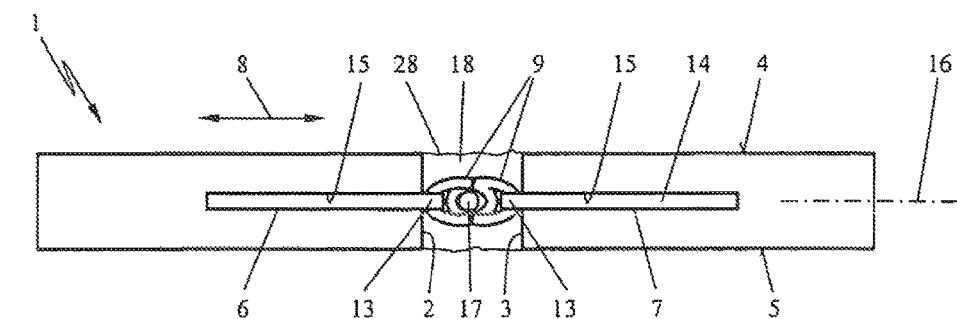
FIG. 1 shows a side view of a belt.

The belt shown schematically in FIG. 1 is a fabric belt woven from one or several fabric layers, as is used for example in the production of paper, especially the production of corrugated cardboard. Such a fabric belt 1 for producing a corrugated cardboard web in a corrugated cardboard machine must be joined at its two ends 2, 3 into an endless belt. The endless belt thus forms an outer paper side 4 facing the corrugated cardboard web and an inner load side 5 on which the drive forces are introduced into the belt. The product such as a corrugated cardboard web rests on the paper side, whereas the driving drums rest in a force-transmitting manner on the load side of the revolving belt.

A coupling device consisting of two connecting pieces 6 and 7 are provided for connecting the belt ends 2 and 3.

Figure 2:
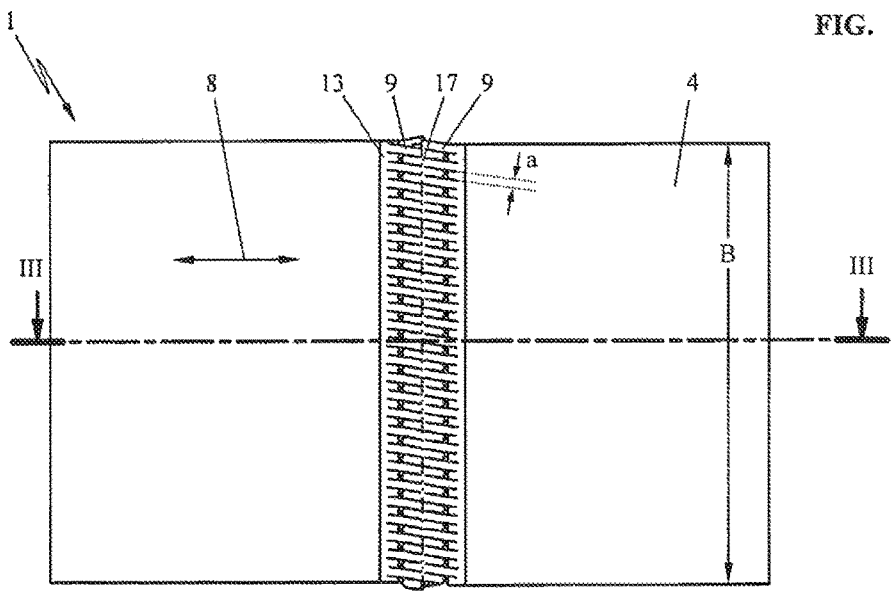
FIG. 2 shows a top view of the connecting region of the belt according to FIG. 1.

In an appropriate embodiment, the connecting pieces 6, 7 consist of a base body 10 which is formed by a piece or strip of fabric 11. The strip of fabric 11 comprises a fastening strip 13 on its one longitudinal edge 12, in which a plurality of clips 9 are held adjacent to each other at a distance a (FIG. 2). The remainder of the stripper fabric 11 which does not form the fastening strip 13 represents a connecting section 14 of the connecting piece. The fastening strip 13 extends in one embodiment of the invention over the entire width B of the belt 1. As a result, clips 9 situated adjacent one another at a distance a are therefore provided over the entire width B of the belt 1.

The connecting section 14 appropriately corresponds to the width of the fastening strip 13 transversely to the longitudinal direction 8 of the belt 1, which thus also extends like said fastening strip over the width B of the belt 1.

As is shown in FIGS. 1 to 4, one respective receiving gap 15 is arranged in the ends 2, 3, which receiving gap is used for accommodating the connecting section 14 of a connecting piece 6, 7. The receiving gap 15 can advantageously be formed by gaps in the fabric of the belt end. The receiving gap 15 extends in the respective end 2, 3, originating from the belt end 2, 3, between the paper side 4 and the load side 5. The receiving gap 15 thus appropriately extends approximately parallel to the plane 16 (FIG. 1) of the belt 1. The receiving gap lies approximately centrally between the paper side 4 and the load side 5 in the embodiment according to FIGS. 1 to 4. The receiving gap 15 is thus arranged and formed symmetrically to the belt plane 16.

In order to achieve a good connection between the connecting section 14 of a connecting piece 6, 7 and the respective belt end 2, 3, the depth T of the receiving gap 15 as measured in the longitudinal direction 8 of the belt 1 corresponds approximately to a part of the width B (FIG. 4) up to the width B of the belt 1. The depth T of the receiving gap 15 is appropriately approximately 50% of the width B of belt 1.

For the purpose of connecting the belt ends 2 and 3 of a belt 1 into an endless belt, a connecting piece 6, 7 is inserted into each belt end 2, 3, wherein the connecting section 14 is fixed in the receiving gap 15. The connecting section 14 which is situated in the receiving gap 15 can especially be riveted, screwed, sewed, glued, welded or mechanically connected in any other suitable way to the belt 1. For welding purposes, the fabric strip of the connecting piece 6, 7 is made from a suitable, preferably the same, material as the fabric of the belt 1. In one embodiment, at least some of the threads of the belt fabric consist of a plastic material, especially a polyamide, a polyester or the like.

If the connecting sections 14 are fixed in the respective receiving gap 15 of the belt ends 2, 3, the clips are slid into each other in a meshing fashion, so that one clip of the connecting piece 6 is situated in an alternating fashion adjacent to a clip 9 of the connecting piece 7. A coupling rod 17 is inserted into the clips 9 that mesh with each other in this manner (as shown in FIG. 3), by means of which the clips 9 of the one connecting piece 6 cooperate with clips 9 of the other connecting piece 7 in a force-transmitting way.

In the illustrated embodiment according to FIGS. 1 to 5, the clips 9 of a connecting section 6 and 7 are formed by a spiral 19. As is shown in FIG. 2, the individual windings of the spiral are disposed under an angle in relation to the longitudinal direction 8 of the belt 1.

Figure 3:
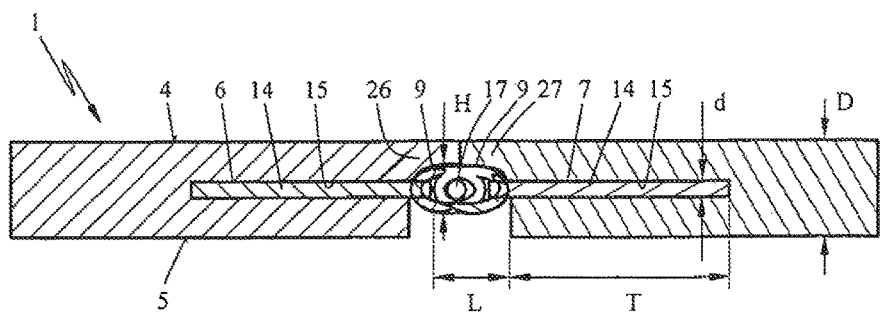
FIG. 3 shows a sectional view along the line III-III in FIG. 2.
Figure 4:
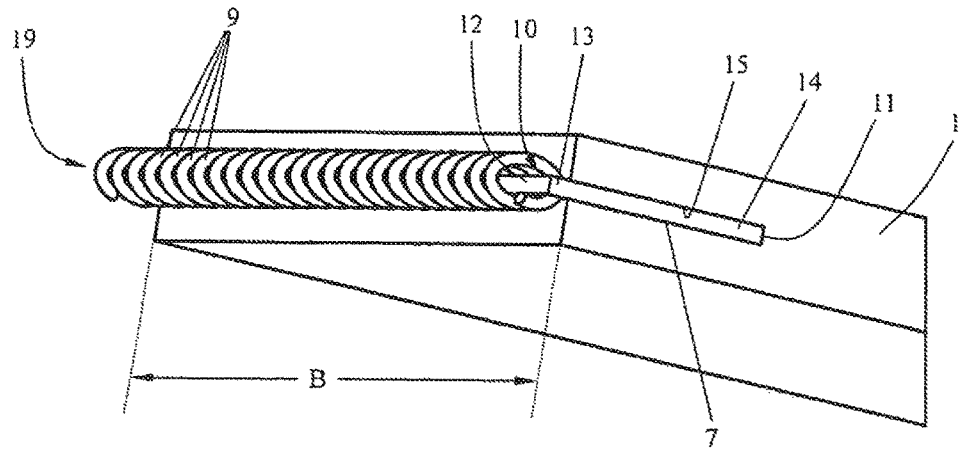
FIG. 4 shows a view of an end of a belt with a connecting piece held in a receiving gap.

As is shown in FIGS. 1 and 3, the height H of the clips 9 or spiral 19 is lower than the thickness D of the belt 1.

If the connecting pieces 6 and 7 are fixedly connected to the belt in the receiving gaps 15 of the belt ends 2 and 3 with their connecting sections 14 and the clips 9 or spirals 19 are connected to each other in a force-transmitting manner by inserting the coupling rod 17, there is a cavity 18 between the clips 9 and spirals 19, and the paper side 4 and the load side 5, respectively (as shown in FIGS. 1 and 3). This cavity is appropriately filled by flock-coating 28 by polyester flocks or a similar material, as is schematically shown in FIG. 1.

In the alternative embodiment as shown in FIG. 3, a fabric wall 26, 27 overlaps the clips 9 or the spiral 19 at least over a part of its length L measured in the longitudinal direction 8 of the belt. As is shown in FIG. 3, a fabric wall 26 and 27 extends from the respective belt end 2, 3 for covering the clips 9, so that the paper side 4, despite the coupling device for the belt ends 2, 3, consists of a flat uninterrupted fabric surface. Alternatively, a fabric wall can also be provided on only one belt end 2, 3, which in this case covers the entire coupling area of the connecting pieces 6 and 7.

Figure 5:
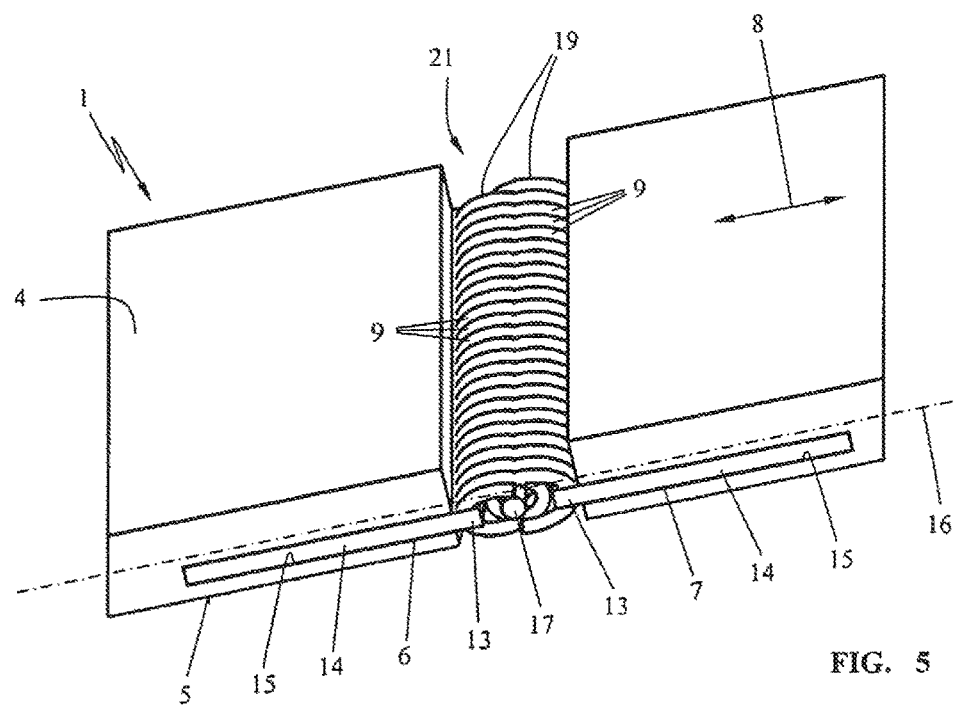
FIG. 5 shows a perspective view of the connecting region of a belt in a further embodiment.
Figure 6:
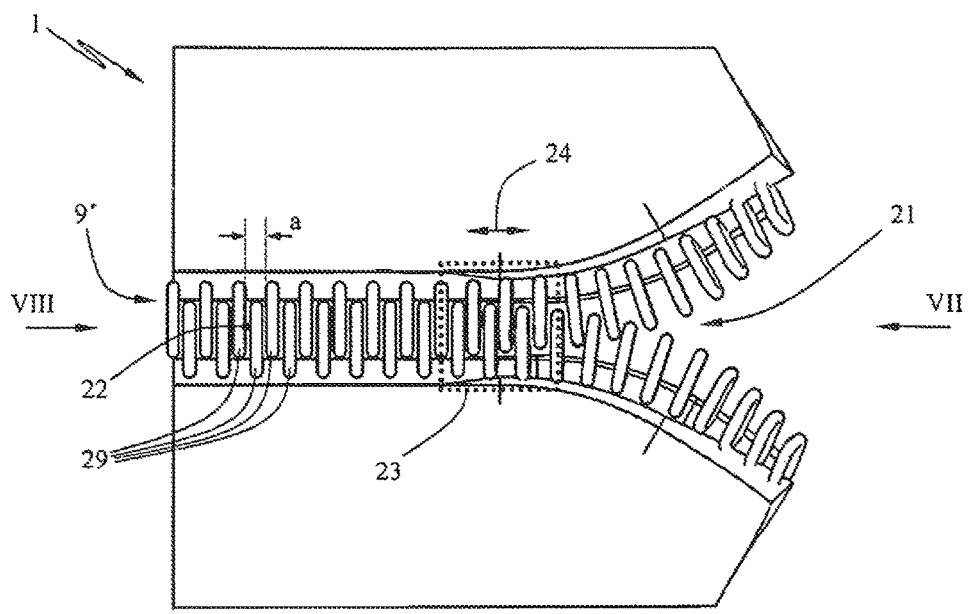
FIG. 6 shows a top view of the connecting region of a belt with clips engaging into each other in the manner of a zip fastener.
Figure 7:
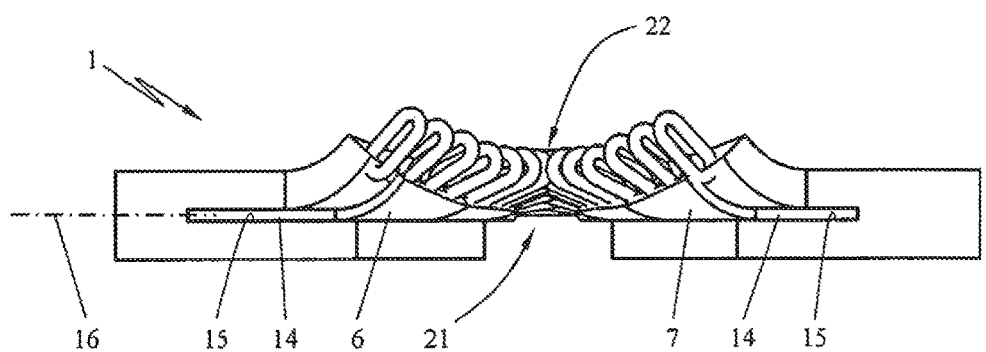
FIG. 7 shows a view of the connecting region in the direction of arrow 7 in FIG. 6.
Figure 8:
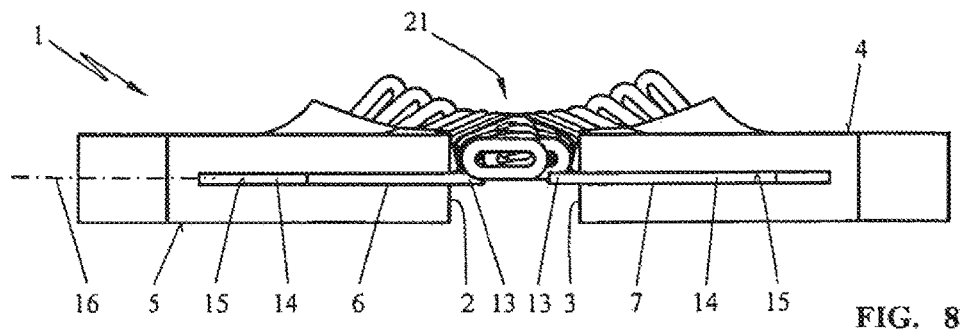
FIG. 8 shows a view of the connecting region in the direction of arrow 8 in FIG. 6.

In the embodiment according to FIG. 5, the belt end 2 and 3 is split asymmetrically, i.e. the receiving gap 15 lies asymmetrically with respect to the plane 16 of the belt 1. In the embodiment according to FIG. 5, the receiving gap 15 lies on one side of the plane 16. Such an arrangement can be appropriate for example when high wear and tear of the fabric belt occurs on the paper side 4. The operational lifespan of the belt can be increased by displacing the receiving gap in the direction towards the load side 5.

The clips 9 or spiral 19 can be made of wire. The clips 9 or spirals 19 appropriately consist of plastic.

In the embodiment according to FIGS. 6 to 10, the clips 9' are formed as the members 29 of a zip fastener, as a result of which the coupling rod 17 can be omitted. The members 29 of the zip fastener are fixed to a fastening strip 13 according to the clips 9 or spiral 19, which strip is a part of a fabric strip 11 forming the connecting piece 6, 7. The connecting section 14 formed on the fabric strip 11 is fixed in the receiving gap 15 of the belt end 2, 3 in the same way as described in the embodiment according to FIGS. 1 to 5.

Figure 9:
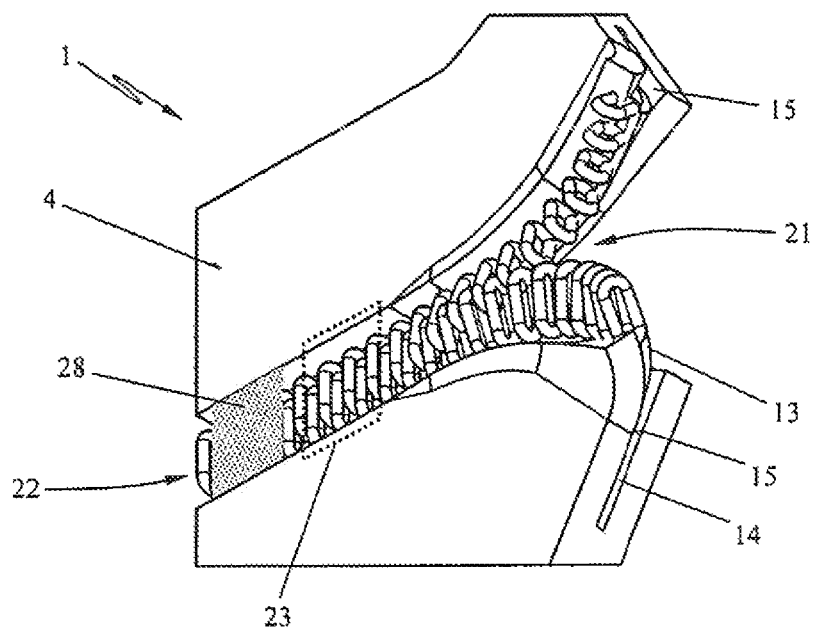
FIG. 9 shows a perspective view of the connecting region in FIG. 6.
Figure 10:
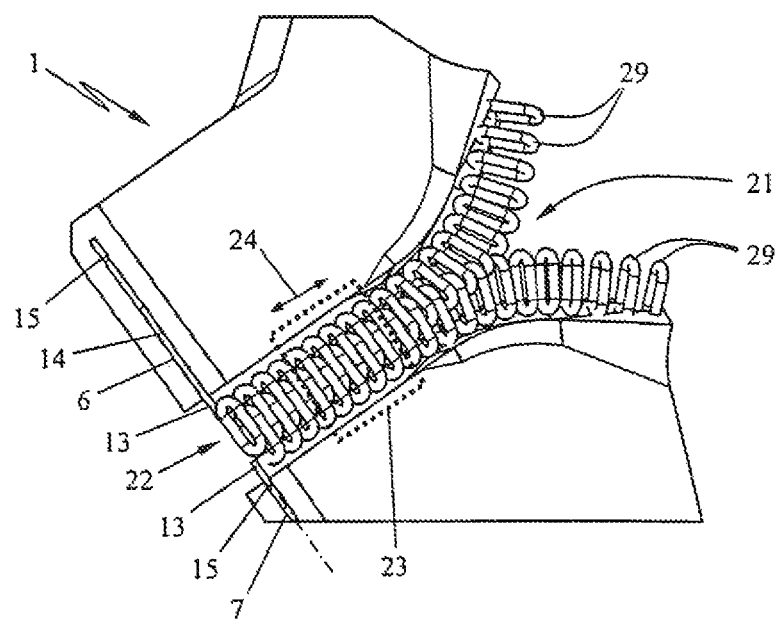
FIG. 10 shows a further perspective view of the connecting region according to FIG. 6.

The members 29 of the zip fastener are meshed into each other via a slider 23 indicated in FIGS. 6 to 10, thus producing the force-transmitting connection between the belt ends. The connecting region 21 is covered on the paper side 4 in the same manner as schematically shown in the embodiment according to FIGS. 1 to 5, e.g. by flock-coating 28 as schematically shown in FIG. 9.

The slider is displaceable transversely to the longitudinal direction 8 of the belt in the direction of the double arrow 24, by means of which the members 29 of the zip fastener are either meshed into each other in a force-transmitting way or are opened for releasing the belt from the corrugated cardboard machine.

The formation of the receiving gap can be achieved in a simple manner by symmetrical or asymmetrical splitting of the belt end 2 and 3. The fabric strip 11 which forms the connecting section 14 is provided in such a thin way with respect to its thickness d that it does not lead to an enlargement in the thickness of the belt end after the insertion into the receiving gap 15 and after fixing to the belt. In the embodiment, the thickness d of the connecting section 14 is approximately 8% to 15% of the thickness D of the fabric belt 1. Since the belt end is pressed to the thickness D after the insertion of the connecting section 14 into the receiving gap 15, no increase in the thickness occurs in the region of the belt ends 2 and 3.

The invention claimed is:

1. A fabric belt for producing a corrugated cardboard web in a corrugated cardboard machine, wherein the belt is joined together at the two ends thereof to produce an endless belt, and comprises an outer paper side which faces the corrugated cardboard web and an inner load side which is assigned to the drive, wherein first and second connecting pieces are provided for connecting the two belt ends, said first connecting piece comprising a first plurality of clips which lie next to one another at a distance at one end transversely to the belt and are fixed at an opposite end with a connecting section to a first belt end of the two belt ends, said second connecting piece comprising a second plurality of clips which lie next to one another at a distance at one end transversely to the belt and are fixed at an opposite end with a connecting section to a second belt end of the two belt ends, wherein in the longitudinal direction of the belt the clips of the first connecting piece cooperate with the clips of the second connecting piece in a force-transmitting manner, wherein the connecting section of each connecting piece is held in a respective receiving gap of the belt and, starting from the first or second belt end, the respective receiving gap extends between the paper side and the load side, wherein the clips are arranged as members of a zip fastener and engage into each other in a force-transmitting manner for connecting the two belt ends, wherein the receiving gap is formed by splitting of the belt end, wherein the receiving gap lies at a greater distance from the one paper side than from the load side, wherein the zip fastener is connected only to the first and second connecting pieces and not to the outer paper side and not to the inner load side, wherein the first connecting piece and the second connecting piece each comprises a respective base body comprising a respective fabric strip, wherein the respective fabric strip comprises a fastening strip for the clips and comprises a remaining fabric strip, wherein the fastening strip is arranged adjacent to a longitudinal edge, wherein the remaining fabric strip forms the connecting section, and wherein the fabric strip is made of the same material as the fabric of the belt.

2. The fabric belt according to claim 1, wherein the receiving gap extends approximately parallel to the plane of the fabric belt.

3. The fabric belt according to claim 1, wherein the depth of the receiving gap as measured in the longitudinal direction of the belt approximately corresponds to a portion of the width or the width of the belt.

4. The fabric belt according to claim 1, wherein the respective connecting section of the first and second connecting pieces situated in the receiving gap is mechanically connected to the belt.

5. The fabric belt according to claim 1, wherein the height of the clips is equal to or less than the thickness of the belt.

6. The fabric belt according to claim 5, wherein the clips lie in the receiving gap over a portion of their length as measured in the longitudinal direction of the belt.

7. The fabric belt according to claim 6, wherein the clips of the first and second connecting pieces are completely covered on the paper side of the belt by the fabric of the belt.

8. The fabric belt according to claim 1, wherein the clips comprise plastic.

9. The fabric belt according to claim 1, wherein the clips of the first connecting piece are formed by a spiral.

10. The fabric belt according to claim 1, wherein at least some of the threads of the belt fabric comprise a plastic material.

* * * * *